United States Patent [19]

Haarhaus et al.

[11] 3,710,108
[45] Jan. 9, 1973

[54] RELATING TO DIRECT READING CALCULATORS
[75] Inventors: John J. Haarhaus, Plainview; Richard J. McEvilly, New Hyde Park, both of N.Y.
[73] Assignee: Joel Halpern, a part interest
[22] Filed: May 24, 1971
[21] Appl. No.: 146,109

[52] U.S. Cl..................235/79, 235/79.5, 235/87 R, 235/117 A
[51] Int. Cl. .........................G06g 1/08, G06c 27/00
[58] Field of Search......235/87, 117 A, 79, 117, 118, 235/79.5, 84

[56] References Cited

UNITED STATES PATENTS

| 1,409,583 | 3/1922 | Robinson | 235/79.5 |
| 1,645,009 | 10/1927 | King | 235/79.5 |
| 2,665,062 | 1/1954 | Adler | 235/87 R |
| 2,788,174 | 4/1957 | Taylor | 235/79.5 |
| 3,147,915 | 9/1964 | Cresswell, Jr. | 235/79.5 |
| 3,275,235 | 9/1966 | Balch | 235/84 |

*Primary Examiner*—Stephen J. Tomsky
*Attorney*—Joel Halpern

[57] ABSTRACT

This invention relates to direct reading calculators and to same when incorporated as part of a shopping cart handle. Briefly, the calculator comprises a pair of rotatable cylindrical members each of which carries a logarithmic scale. Means are provided for indexing one of the cylindrical members to the other for simultaneous rotation. The scales are preferably calibrated respectively in price units and in weight and volume units.

12 Claims, 6 Drawing Figures

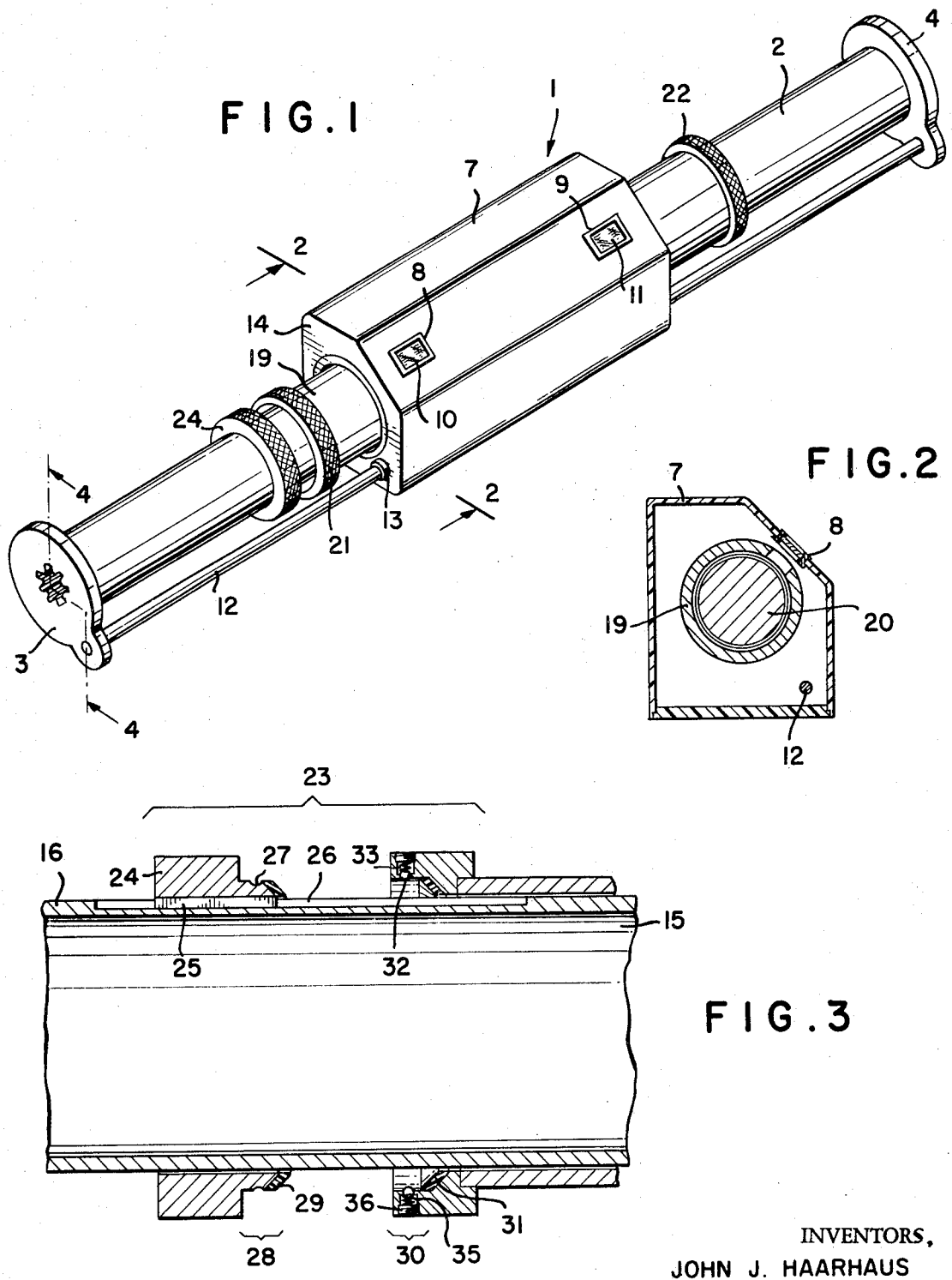

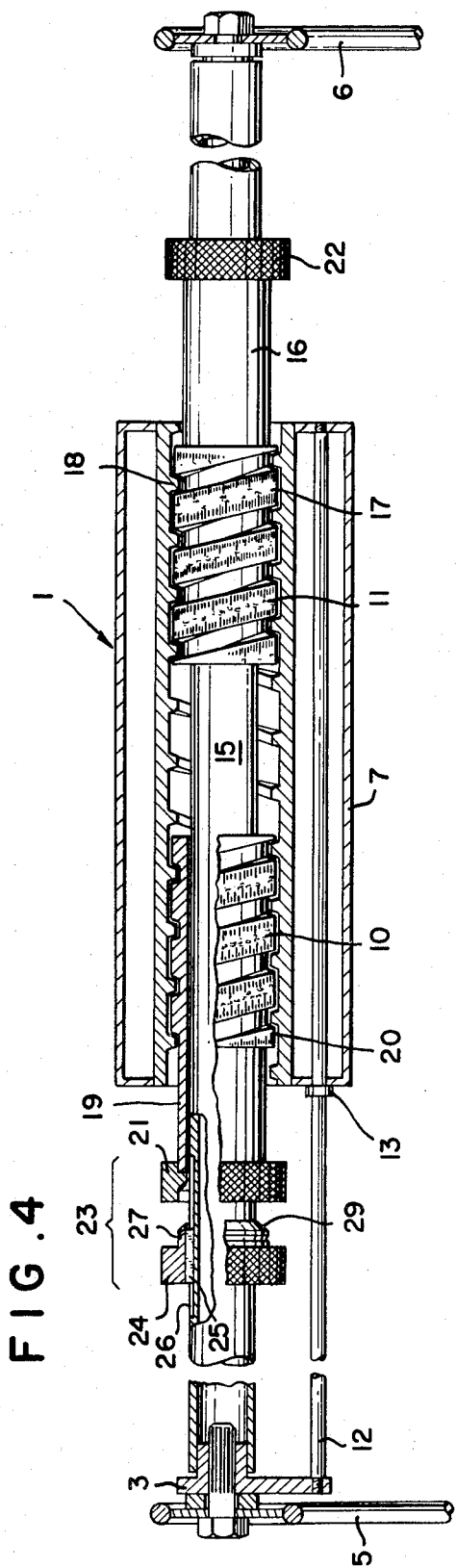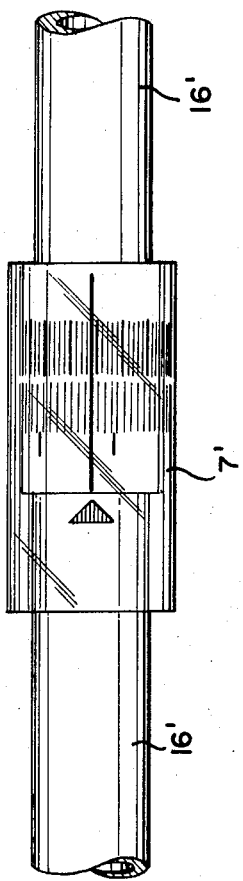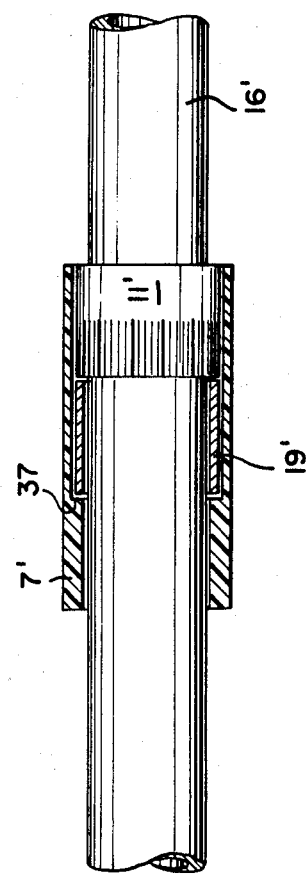

RELATING TO DIRECT READING CALCULATORS

The present invention relates to calculators and, more particularly, to a direct reading calculator in which a numerical ratio may be established, a third value may be indexed and a fourth value may be read directly bearing the same relationship to said third value as said ratio. The calculator of the present invention has special utility in the marketing field in conjunction with the unit pricing of various consumer commodities. However, it is also contemplated that the device may be adapted for use in connection with the conversion of currency from one valuation standard to another and in various measurement determinations such as in converting from one system of units, i.e. the metric system, to a second system such as the British system. Since the presently preferred embodiment of the invention is as a shopper's aid, such embodiment will be specifically described.

The average shopper has long recognized the need for a convenient means for determining the equivalent price values of like commodities packaged and marketed in different quantities. Such commodities are customarily stamped or otherwise labeled with an indication of the total packaged weight or volume and with the total selling price. However, one desiring to compare the equivalent value of two products packaged in either the same or different sized containers must perform a series of arithmetic computations which are not only time consuming but which require a proficiency in mathematics. When one considers the number of purchases made by the average supermarket shopper, it becomes readily apparent that the inconvenience and ever constant possibility of error leave the shopper without recourse to a practical means for determining comparative price values.

More recently various government agencies have come to appreciate the need to provide shoppers with assistance in regard to unit prices and comparative price values. This recognition has, for example, led to the enactment by the Council for the City of New York of legislation requiring that specified classes of consumer commodities be plainly marked with the total selling price and with the price per measure of weight or volume at the point of display. Such legislation, although a step in the right direction, imposes a substantial burden on the shopkeeper who must now continuously monitor shelf markings and effect changes to reflect day-to-day fluctuations in selling price. When one considers the hundreds of items offered for sale, it will be instantly recognized that the maintenance of such monitoring procedures must lead to increased operational costs which will inevitably be borne by the consumer. Further, the shopper must still resort to arithmetic computation to make determinations on comparative price values where either the unit prices of two products vary or where the products are marketed in containers of different sizes. Where the products to be compared are located remote from each other, the shopper must also provide for recordation of the relevant values of the first product before commencing the said arithmetic computations.

In view of the foregoing, it is one object of this invention to provide a direct reading calculator for the ready determination of a set of comparative numerical values having a predetermined relationship to a preestablished ratio.

Another object of the invention is the provision of a direct reading calculator for the ready conversion of monetary values in one currency standard to equivalent values in another currency standard, said equivalent values having a predetermined relationship to a preestablished set of values.

Still another object of the invention is the provision of a direct reading calculator for the ready conversion of measurement units from one measurement system to units of another measurement system, the converted units having a predetermined relationship to a preestablished set of unit values.

Yet another object of the invention is the provision of a shopping cart handle incorporating a direct reading calculator which will enable a shopper to readily determine the comparative price values of a pair of commodities where such commodities are packaged in containers of different sizes and/or have different unit price values.

Other objects and a more complete understanding of the invention may be obtained by reference to the following description and claims taken in conjunction with the accompanying drawings in which:

FIG. 1 is a perspective view of a shopping cart handle with the direct reading calculator of the invention incorporated thereon;

FIG. 2 is a cross-sectional view of the combination shown in FIG. 1 taken along line 2—2 of FIG. 1;

FIG. 3 is a longitudinal cross-sectional view of the handle portion of the combination to the left of the console depicted in FIG. 1;

FIG. 4 is a longitudinal cross-sectional view of the combination shown in FIG. 1 and taken along line 4—4 of FIG. 1;

FIG. 5 is a plan view of a modification of the calculator shown in FIG. 1; and

FIG. 6 is a view of the modified structure of FIG. 5 with a portion of the console cover removed.

Broadly, the invention comprises a first rotatable cylindrical member having a first logarithmic scale thereon, a second independently rotatable cylindrical member having a second logarithmic scale thereon, and means for detachably connecting said first and second cylindrical members for simultaneous rotation, at least selected segments of said scales being readily and directly visible. Preferably, window means are provided for viewing only said selected segments of said scales.

Referring to FIGS. 1 through 4, there is illustrated a combination shopping cart handle and calculator 1. The handle portion 2 is an elongated member which preferably extends between a pair of end brackets 3 and 4 adapted to mount the combination within the uprights 5 and 6 of the cart. It will, of course, be understood that the ends of the handle may be directly journaled within the uprights or otherwise carried by said supports.

A console 7 is positioned intermediate the ends of handle 2 and generally comprises a housing for the central portion of the handle and contains window means, preferably a pair of windows 8 and 9. The windows are utilized for the viewing of logarithmic scales 10 and 11 described in detail hereafter. To prevent rotation or lateral displacement of the console, a console positioning rod 12 is provided which extends between the end brackets 3 and 4. The positioning rod may be secured to the console in any convenient manner so as to prevent lateral displacement thereof. For example, lugs 13 may be formed integral with the rod and positioned to abut against the side panels 14 of the console. If desired, the positioning rod may comprise two segments, the inner end of each of said segments being secured to a respective side panel. Alternatively, the positioning rod may comprise a unitary member which extends through the console and may be provided with means such as lugs 13 or equivalent stopping means.

Handle 2 may be formed as an inner grip rod 15 which is non-rotatably mounted within either the end brackets or within the cart uprights, the grip rod being positioned within a hollow outer base cylinder 16. In the latter constructional arrangement, the base cylinder and grip rod are dimensioned such that the outer diameter of the grip rod is equal to the inner diameter of the base cylinder less the clearance therebetween. The clearance should be sufficient to permit ready rotation of the base cylinder on said grip rod. However, it is to be understood that the handle may comprise a single elongated rod which extends between either the end brackets or the uprights of the cart. In such event it is essential that the rod be rotatably carried by the end brackets of uprights.

An intermediate portion of base cylinder 16 is provided with a threaded track segment 17 upon which a logarithmic scale 11 is secured. The interior overlying surface of the console is provided with a complementary track 18 adapted to threadedly receive track segment 17 upon rotation of said base cylinder 16. Such rotation of the base cylinder will result in the incremental displaying of the logarithmic scale 11 in window 9.

Mounted concentrically and slidably upon base cylinder 16 is an indexing cylinder 19. The indexing cylinder is provided with a threaded track segment 20 identical to that of track segment 17. The track 18 of the console extends over the interior surface overlying track 20 of the indexing cylinder and is adapted to threadedly receive same upon rotation of said indexing cylinder. The threads of track 20 are provided with a logarithmic scale 10. As the indexing cylinder is threaded into the console the indicia on scale 10 will incrementally appear in window 8.

Knurled dials 21 and 22 are provided on the indexing and base cylinders and are employed to facilitate rotation of said cylinders.

In order to lock the indexing cylinder to the base cylinder for simultaneous rotation of both cylinders a locking mechanism 23 is provided. This locking mechanism desirably includes a knurled lock dial 24 having a splined portion 25 adapted to ride within a longitudinally extending keyway 26 formed in the outer surface of the base cylinder 16. The lock dial is preferably provided with a lock ball groove 27 in a collar portion 28 thereof, the said collar portion terminating in a bevelled edge brake surface 29 formed of a synthetic material such as neoprene. Locking mechanism 23 also includes knurled dial 21 of the indexing cylinder 19. This dial is given an annular hollow neck portion 30 adapted to receive collar 28 of the lock dial. A bevelled brake surface 31, preferably formed of the same material as that of brake surface 29, is disposed within the hollow annular portion of dial 21 and is shaped to be complementary to brake surface 29 in order to insure nesting of the collar of lock dial 24 within dial 21. To further assist in retaining lock dial 24 in nested relationship within dial 21, the latter dial is provided with a spring loaded lock ball 32 seated in a radial bore 33 which extends through the neck 30 of dial 21. Ball 32 is urged into lock ball groove 27 by means of spring 35 which is retained within bore 33 by cap screw 36.

It will be understood that whereas a specific locking mechanism has been illustrated and described, it is contemplated that other means for detachably locking the indexing cylinder to the base cylinder may be employed. For example, the lock dial and keyway arrangement may be replaced with an edged tooth arrangement at the abutting end portions of the indexing cylinder and intermediate portion of the base cylinder upon which track segment 17 is mounted. Sliding of the indexing cylinder 19 towards the track segment 17, and the rotation thereof, make it possible to effect meshing of the adjacent teeth and the simultaneous rotation of the indexing and base cylinders. By utilizing suitable coating material on the surfaces of the engaging teeth it is possible to improve the frictional engagement of the opposed surfaces. It is also within the ambit of this invention to provide for threading of the indexing cylinder within the base cylinder or for otherwise providing a limited degree of frictional engagement between the two cylinders so as to permit simultaneous rotation of both cylinders. Provision of magnetic material on either or both of the engaging surfaces of the indexing and base cylinders is still another means for coupling of the two cylinders. A ratchet-like arrangement may be employed to advantage to permit rotation of the indexing and/or base cylinder independently in one direction and yet permit simultaneous rotation of both cylinders in the other direction. Thus, it will be appreciated that numerous expedients may be resorted to in order to provide for detachably connecting the indexing cylinder to the base cylinder when simultaneous rotation of both cylinders is desired.

As hereinbefore stated, scales 10 and 11 are logarithmic scales preferably to the base 10. Logarithmic scales to other bases may, however, also be utilized. In view of the fact that the presently most preferred embodiment of the invention is a combined calculator and shopping cart handle, it has been found that one of scales 10 or 11 should be calibrated in units of weight or volume measure whereas the other of the scales should be calibrated in momentary pricing units. The pitch of the thread tracks and the range of units for the scales may be selected as may be desired so as to provide the widest possible practical end limits. Obviously the width of the shopping cart imposes a limitation on the width of the console which may be employed. Further, as tracks 17 and 20 proceed into the console a point will be reached where interference between the end of indexing cylinder 19 and the inner end of the intermediate portion of base cylinder 16 will occur. These factors must be taken into consideration in the determination of the thread pitch and in the number of scale cycles to be utilized.

Applicant has found it most convenient to calibrate scale 10 in weight and volume measurement units and to calibrate scale 11 in momentary pricing units. The thread pitch for each of cylinders 16 and 19, total number of thread cycles, and spacing of windows 8 and 9 are readily determined after one has decided upon the information to be displayed on the scales and the ranges for the scales. Thus, the amount of information to be carried on each scale determines the width of the scale and the ranges to be covered by the scales determines the total length of each scale. Once these parameters have been established, and the available console space is known, determination of the thread pitch and number of thread cycles becomes a simple problem of routine arithmetic. Similarly, one may determine the spacing between windows 8 and 9 in order to insure display of the entire range of each scale without interference within the console.

FIGS. 5 and 6 illustrate a modification of the calculator heretofore described. Base cylinder 16' is not provided with a threaded track segment. Instead, the logarithmic scale 11' extends circumferentially about the cylinder. Similarly, indexing cylinder 19' is provided with its logarithmic scale in circumferential manner. The interior surface of the console 7' is not threaded but rather is adapted to slide easily over the exterior surfaces of both cylinders. It has, however, been found convenient to provide an internal shoulder 37 on the interior surface of the console so that the longitudinal sliding movement of the console may be limited as may be desired. Also, as with the embodiment of FIGS. 1 through 4, various means for coupling the indexing and base cylinders for simultaneous rotation, when desired, may be employed.

Referring to FIGS. 1 through 4, a shopper desiring to determine the comparative price values of two products A and B would operate the calculator as follows. Indexing cylinder 19 would first be threaded into the console until the total weight or volume measurement indicated on package A is visible in window 8 and is in registry with a hairline provided to insure accuracy. Base cylinder 16 is then threaded into the console until the total price of commodity A appears in window 9 and is brought into registry with the hairline associated with window 9. The indexing and base cylinders are then locked for simultaneous rotation, a ratio having been incorporated into the calculator between the values on the weight and volume and pricing scales. The cylinders are rotated simultaneously until the total weight or volume measurement displayed on the package for product B appears in window 8 and is in registry with the hairline. The shopper need then only read the value at the hairline on window 9. This value in window 9 is the equivalent price of product B and the shopper should not pay more than this value for product B unless he or she is willing to pay the excess price because of some consideration such as quality, convenience of the form of the product, etc. The calculator has, however, clearly indicated that compared with product A on unit price alone there is no need to pay more for product B.

It will be appreciated that the size of the calculator and/or the readability of the scales may be enhanced by employing magnification means in the window areas. This may be of extreme importance in connection with a calculator intended for use as a portable device where size and weight are important and sometimes overriding factors.

It will also be understood that whereas the presently preferred embodiments described utilize cylinders with the scales permanently affixed thereto, it is within the scope of the invention to employ cylinders in the form of reels and to utilize continuous or non-continuous tape as the scales. The reels would be suitably indexed for detachably connecting one tape-carrying reel with one another.

Although we have described the invention with a certain degree of particularity, it is understood that the disclosure has been made only by way of example and that numerous changes in the details of construction and the combination and arrangement of parts may be resorted to without departing from the spirit and scope of the invention as hereinafter claimed.

What is claimed is:

1. A direct reading calculator, comprising first and second rotatable cylindrical members having respective threaded track segments carrying respective logarithmic scales, a console being provided adapted to enclose at least a portion of each of said track segments and permit direct viewing of at least selected segments of said scales, the interior of said console being provided with tracking means for cooperatively interacting with said first and second threaded track segments, and means for detachably connecting said first and second cylindrical members for simultaneous rotation.

2. A direct reading calculator, according to claim 1, wherein said console is provided with window means for viewing portions of the said first and second logarithmic scales which appear therein.

3. A direct reading calculator, according to claim 1, wherein the first of said cylinders comprises the handle of a shopping cart and said second cylinder is slidably and concentrically mounted on said first cylinder.

4. A direct reading calculator, according to claim 3, wherein an intermediate portion of said first cylinder is provided with said first threaded track segment.

5. A direct reading calculator, according to claim 3, wherein said first cylinder is rotatably mounted upon an inner grip rod, said inner grip rod being non-rotatably mounted on said cart.

6. A direct reading calculator, according to claim 5, wherein said inner grip rod is mounted between a pair of end brackets and said end brackets are mounted in the uprights of said cart.

7. A direct reading calculator, according to claim 1, wherein one of said logarithmic scales is calibrated in price units and the other of said scales is calibrated in units selected from weight and volume.

8. A direct reading calculator according to claim 1, wherein said tracking means of said console comprises a complementary track integral with the interior surface of the console and overlying the respective threaded track segments of said cylindrical members.

9. A shopping cart handle, comprising a first elongated rotatable cylindrical member having a threaded track segment carrying a first logarithmic scale thereon, a second independently rotatable cylindrical member having a second logarithmic scale carried thereon, a console being provided adapted to enclose at least a portion of each of said track segments and permit direct viewing of at least selected segments of said scales, the interior of said console being provided with tracking means for cooperatively interacting with said first and second threaded track segments, means for detachably connecting said first and second cylindrical members for simultaneous rotation, and said cylindrical members being adapted for mounting within the uprights of a shopping cart.

10. A shopping cart handle, according to claim 9, wherein said console is provided on its interior surface with a complementary track integral therewith to threadedly receive said first and second threaded segments of the first and second cylindrical members.

11. A shopping cart handle, according to claim 10, wherein said first cylindrical member is rotatably mounted upon an inner grip rod and said inner grip rod is adapted to be non-rotatably mounted within the uprights of said shopping cart.

12. A shopping cart handle, according to claim 9, wherein one of said logarithmic scales is calibrated in price units and the other of said scales is calibrated in units selected from weight and volume.

* * * * *